United States Patent [19]

Carlin

[11] 4,304,345

[45] Dec. 8, 1981

[54] MODULAR BIDIRECTIONAL TRACTOR FEED ASSEMBLY

[75] Inventor: E. Michael Carlin, Milpitas, Calif.

[73] Assignee: Xerox Corporation, Stamford, Conn.

[21] Appl. No.: 137,215

[22] Filed: Apr. 4, 1980

[51] Int. Cl.³ .................................... G03B 1/30

[52] U.S. Cl. .................................... 226/74; 226/170

[58] Field of Search .................... 226/74, 75, 76, 78, 226/79, 80, 81, 170, 172, 179, 11

[56] References Cited

U.S. PATENT DOCUMENTS

| | | | |
|---|---|---|---|
| 3,407,981 | 10/1968 | Staugaard | 226/171 |
| 3,578,138 | 5/1971 | Canfwell | 226/74 |
| 3,669,327 | 6/1972 | Dowd | 226/11 |
| 3,982,677 | 9/1976 | Lefz | 226/75 |
| 4,022,365 | 5/1977 | Weller | 226/81 |
| 4,033,493 | 7/1977 | Levinson | 226/81 |
| 4,129,239 | 12/1978 | Hubbard | 226/75 |
| 4,130,230 | 12/1978 | Selfz | 226/75 |
| 4,130,230 | 12/1978 | Seitz | 226/75 |
| 4,206,859 | 6/1980 | Plaza | 226/74 |

*Primary Examiner*—Edward J. McCarthy

[57] ABSTRACT

A modular bidirectional tractor feed assembly having its own platen, which is substituted for the platen normally in the printer, is installed on the printer as a single unit using projections on the side platen of the feed assembly. Adjustments are performed on the assembly during manufacture to assure proper alignment of elements to provide error-free feeding of record material and properly aligned printing thereon. The assembly includes mechanism to provide positive assist in loading the record material, mechanism to prevent the perforations in the record material from becoming stuck on the drive pins when the record material leaves the feed mechanism, mechanism for easily locking and unlocking the feed mechanism in position to accommodate various widths of record material and mechanism to easily adjust the tension in the drive pin carrying chains of the feed mechanism.

10 Claims, 13 Drawing Figures

MODULAR BIDIRECTIONAL TRACTOR FEED ASSEMBLY

The present invention relates in general to paper feeding devices and, more particularly, to an improved paper feeding assembly of the type generally used to positively feed marginally punched record or web material past a work station.

With the increased use of computers and word processing systems in conjunction with their associated high-speed printers, there has been an increase in the use of strip-like record material for use in the printing process. The strip-like record material normally constitutes either single-layer web material or a manifold form of multiple layers and normally carries a series of longitudinally spaced perforations, generally along the edges of the material. These perforations in the material are for receiving a similarly positioned series of movable feed pins to effect positive feeding of the form in the direction of movement of the pins. The material is normally transported by a feeding assembly past a work station, such as the platen print area of a printer.

Normally, either a pin wheel feeding device or a tractor feed mechanism is employed in the feeding of the record material to the print area. Generally, the tractors include an endless belt trained in a loop over sprocket wheels, which are driven by a drive shaft of the equipment on which the tractor mechanism is mounted. The belt typically has pins projecting therefrom to engage the perforations provided in the record material and to drive the record material along a linear path. The belt is trained over supports to curve away from the linear path and then return along the loop back to the linear path. These tractors are normally employed in pairs at opposite edges of the record material to drive the record material from both its opposite edges.

Generally, the tractor feed mechanism is employed as an accessory item to be installed on printers as add-on units to feed the record material to the printer. The feed mechanism is normally latched to the platen of the printer, with the platen, in turn, being latched to the printer itself, thereby resulting in two tolerance zones with the possibility of a build-up of the tolerances. This tolerance build-up may cause record material alignment and tension problems with regard to the input and output sides of the printer platen. Such misalignment or excess tension can tend to cause the record material to tear or become oriented in such a manner that misaligned printing occurs.

Prior art record material feed mechanisms generally incorporate two pin wheels (see, for example, U.S. Pat. Nos. 4,022,365 and 4,033,493) or tractor mechanisms (see, for example, U.S. Pat. Nos. 3,982,677 and 4,130,230) to engage the perforations along the edges of the record material; thus, the width of the record material determines the distance between the pin wheels or tractors. The positioning of the pin wheels or tractors affects the tension across the record material transversely of its drive direction. Various means are known for locating the tractors with respect to the record material. U.S. Pat. No. 2,140,028 discloses a device in which rotation of a crank by an operator turns a threaded shaft to shift the tractors to adjust the spacing between them. U.S. Pat. No. 3,407,981 employs flexible cables attached to the tractors, which cooperate with one side of the record material to translate the attached tractors.

In addition, prior art mechanisms often do not provide positive assist in the loading of the record material into the tractor mechanism such that the perforations in the record material are quickly and properly positioned over the pins of the tractor mechanism without mutilating the perforations. Furthermore, prior art mechanisms often do not provide means for adequately removing the record material from the drive pins of the tractor mechanism at the exit area and thereby cause record material jams especially when folds or wrinkles occur in the record material. Further still, prior art mehanisms often do not provide easy and positive means for adjusting or otherwise assuring proper tensioning of the drive pin carrying belt or chain of the tractor mechanism.

The invention as claimed is intended to provide a solution for various prior art deficiencies including any alignment problems between the record material and the print station or print area on the platen, means to easily and quickly release and lock the tractor mechanism to accommodate various widths of record material, means to virtually eliminate paper jams as the record material leaves the tractor mechanism, means to easily adjust the tension in the drive pin carrying chain of the tractor mechanism, means to easily adjust the position of the tractor mechanism with respect to the platen and loading assist means to assure easy and positive loading of the record material into the tractor mechanism.

The invention provides reliable and accurate feeding of record material to the print area of the platen thereby increasing throughput of the system by reducing delays caused by jams of the record material and record material, which is fed in misaligned orientation. Various widths of record material may be used and changed easily and quickly. The invention provides a module of unitized construction, which has its own platen and is installed on the printer as a single unit, after the platen in the printer is removed. All adjustments are performed on the module during manufacture, and none are needed during installation. In addition, the invention provides reversibility in direction of feeding of the record material. Reversibility with precision is highly desirable in printing machines when used to plot graphs, curves, charts and the like.

One means for carrying out the invention is described in detail below with reference to the drawing, which illustrates only one specific embodiment, in which.

Figure 1:
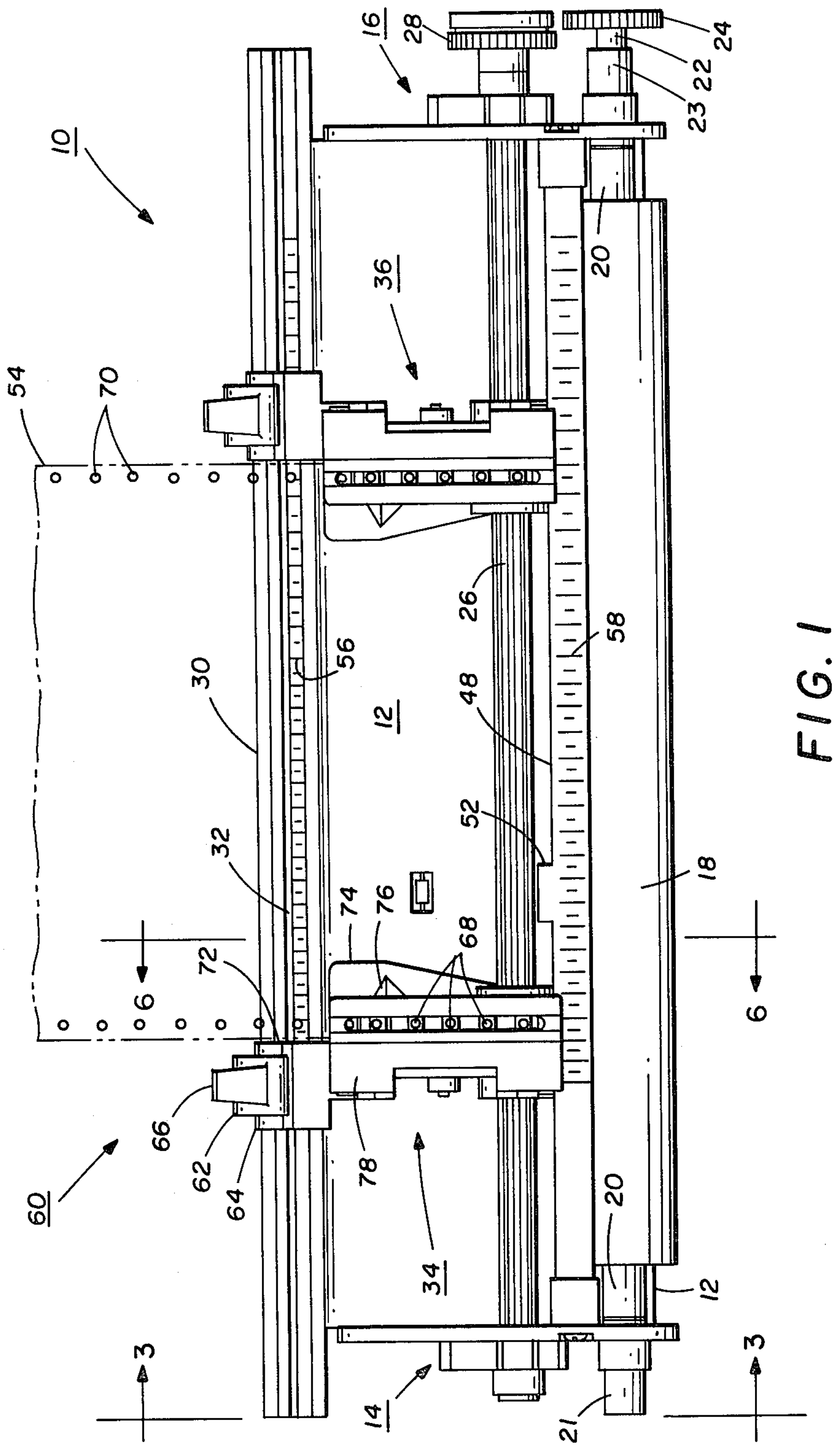
FIG. 1 is a top plan view of a record material feeder embodying the present invention.
Figure 2:
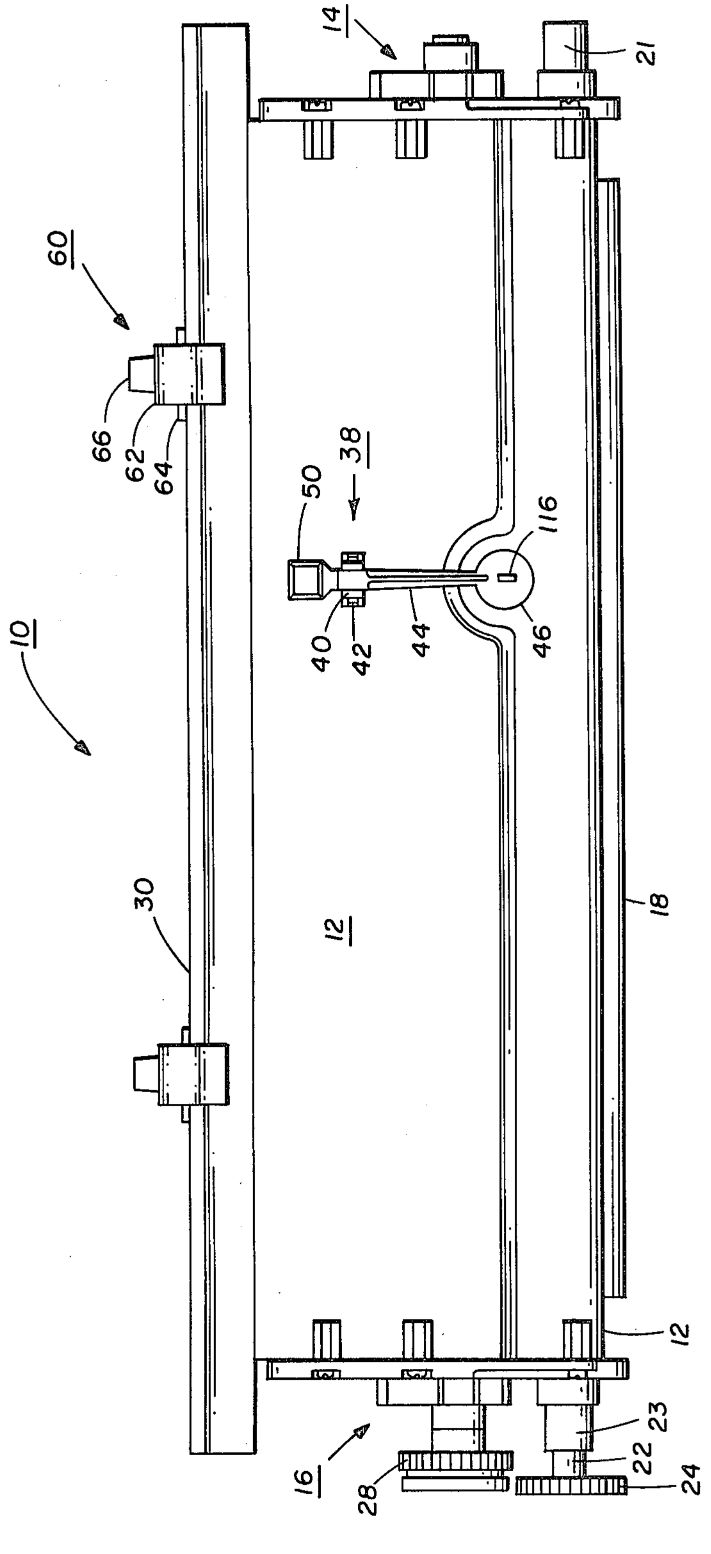
FIG. 2 is a bottom plan view of the record material feeder embodying the present invention.

Referring now to FIGS. 1 and 2, a modular bidirectional tractor feed assembly 10 is shown comprising a base member or paper pan 12 having support members or side plates 14 and 16 removably attached at either end thereof. A platen 18 is mounted to shaft 20 for rotation therewith. The shaft 20 is, in turn, rotatably mounted in sleeve bearings (not shown) located in side plates 14 and 16. A reduced section 22 of shaft 20 extends through side plate 16 and includes gear 24 mounted thereto. Splined shaft 26 is rotatably mounted in sleeve bearings (not shown) located in side plates 14 and 16 with the centerlines of splined shaft 26 and shaft 20 being substantially parallel. Gear 28 is removably mounted to that end portion of splined shaft 26, which protrudes through side plate 16. Gear 28 and gear 24 are positioned to mesh with the platen idler gear 132 (see FIG. 8A). Supports 21 and 23 projecting transversely from side plates 14 and 16, respectively, provide mounting supports for the tractor feed assembly 10 when mounted on a printer (see FIGS. 8A and 8B). The centerlines of supports 21 and 23 are substantially in line with the centerline of platen 18.

Notched rail member 30 is formed as a part or extension of the base member or paper pan 12 and whose centerline lies substantially parallel to shafts 20 and 26. Notch 32 extends the length of rail member 30 and provides a guiding function (to be discussed below) for the tractor mechanisms 34 and 36 as the tractor mechanisms 34 and 36 are positioned to accommodate record material 54 of various widths. Graduated scale 56 along notched rail member 30 will assist the operator in correctly locating tractor mechanisms 34 and 36 for any desired width of record material to be used within the capabilities of the printer.

A rocker arm type of switch actuator 38 is pivotally mounted to the underside of paper pan 12 by posts 40 and pin 42. At one end of rocker arm 44 is a hemispherical button 46, which seats into a cooperating cup (not shown) formed into the bottom of extension 52. Due to gravity, counterweight 50, positioned at the opposite end of rocker arm 44 from the button 46, tends to rotate button 46 upward toward the cooperating cup (not shown) in extension 52. Switch actuator 38 is part of a paper-out sensing means to be more fully described below.

Bar 48 extends between and is removably attached to side plates 14 and 16. Extension 52 provides a stop for tractor mechanism 34 such that the extent of travel of tractor mechanism 34 toward the center of the paper pan 12 is limited. This limitation of travel of tractor mechanism 34 assures that the record material 54, regardless of the width thereof, will always be over the paper-out sensing mechanism. A graduated paper scale 58 is located along the top of bar 48 to assist the operator in referencing the record material 54 in feed assembly 10 or items printed on the record material 54.

Tractor mechanism 34 is slidably mounted to notched rail member 30 and shaft 26. Latch mechanism 60 is a two-position, over-center clamp 62 mounted on and pivoted from the tongue-slide portion 64 of tractor mechanism 34. When latch mechanism 60 is engaged, by rotation of lever 66, the tongue-slide portion 64 is clamped to notched rail member 30. When latch mechanism 60 is disengaged, then tractor mechanism 34 may be repositioned to accommodate a record material of different width. Shaft 26 extends through and operatively contacts drive sprocket 108 (see FIG. 6), which, in turn, operatively engages chain 106 (see FIG. 6), which has offset pins 68, which engage perforations 70 in record material 54 for feeding or driving thereof. Edge 72 of latch mechanism 60 guides the edge of record material 54 into the tractor mechanism 34 as the operator loads the record material 54. Platform 74 is formed as a portion and part of tractor mechanism 34 and extends outwardly therefrom in a direction transverse to the feed path of record material 54 and lying in a plane substantially parallel to paper pan 12. Platform 74 supports the record material 54 during loading. Guide plate 78 is pivotally mounted and rests on top of record material 54 after record material 54 exits from platen 18 and assists in keeping the record material 54 positioned on offset pins 68 during its exit from the tractor feed assembly 10. Tractor mechanism 34 is movable between side plate 14 and extension 52 on bar 48.

Figure 9:
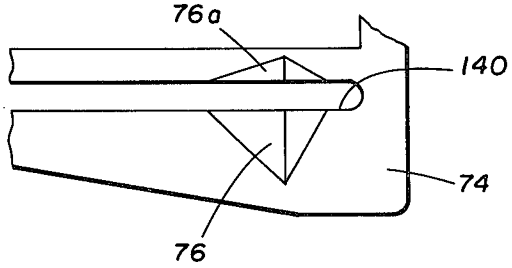
FIG. 9 is a simplified top plan view illustrating the filling slot employed to assist the loading of the record material.
Figure 10A:
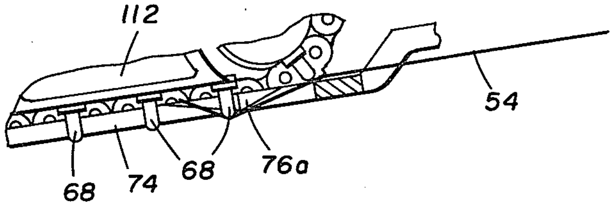
FIG. 10A is a simplified side elevational view showing the relationship between the filling slot and the pins during loading of the record material.
Figure 10B:
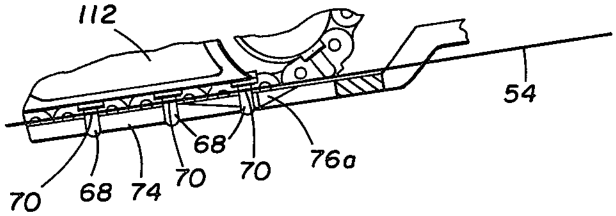
FIG. 10B is a simplified side elevational view showing the relationship between the filling slot and the pins after loading of the record material.

With reference to FIGS. 9, 10A and 10B, platform 74 includes filling slots 76 and 76*a* comprising two V-shaped depressions in platform 74. Filling slots 76 and 76*a* are separated by channel 140, which is configured to receive offset pins 68. Filling slots 76 and 76*a* slope toward channel 140 and provide assist, together with offset pins 68, during the loading of record material 54 by forcing a depression or kink in the record material 54 such that a perforation 70 in the record material 54 will slip over one of the offset pins 68, and the record material 54 will be driven through tractor mechanism 34. As shown in FIG. 10A, a portion of platform 74 has been removed to disclose the relationship between offset pins 68, filling slot 76*a* and record material 54. As the record material 54 is inserted, while the offset pins 68 are moving right to left, an offset pin 68 will normally depress the record material 54 down into the channel 140 and filling slots 76 and 76*a*. As the record material is inserted further from right to left, and the offset pins 68 move from right to left, one of the offset pins 68 will become aligned with one of the perforations 70 in the record material 54. This alignment will occur in the filling slot area. When this alignment occurs, the force in the record material 54, which is attempting to straighten the depression or kink from the record material 54, will push the perforation 70 up around offset pin 68, and the record material 54 will be quickly fed through the tractor mechanism 34, and the perforations 70 will be located on offset pins 68 as shown in FIG. 10B.

Tractor mechanism 36 is also slidably mounted to notched rail member 30 and shaft 26. Tractor mechanism 36 is essentially a mirror image of tractor mechanism 34 with corresponding elements being essentially like those of tractor mechanism 34 and therefore will not be described herein for purposes of brevity. Tractor mechanism 36 is movable between side plate 16 and extension 52 on bar 48.

Figure 3:
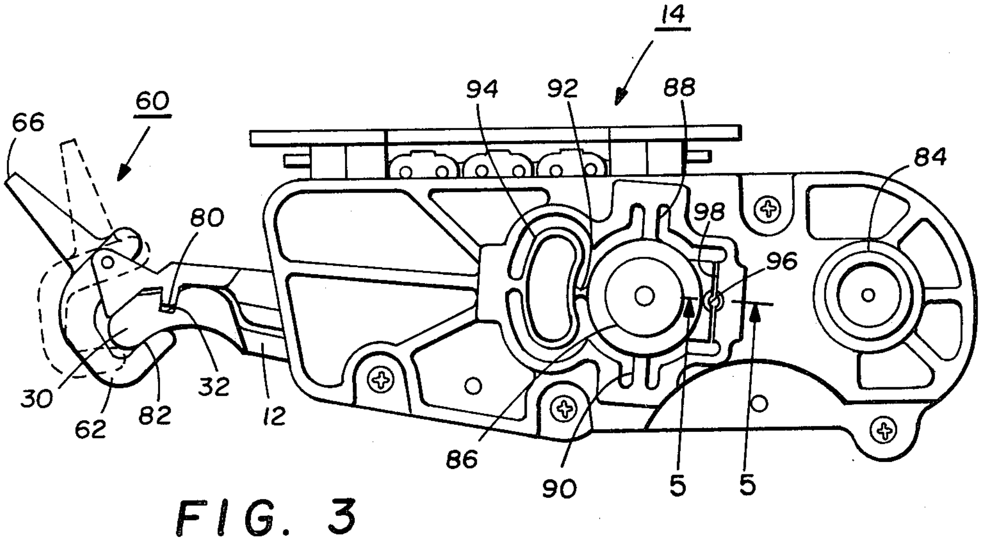
FIG. 3 is a side elevational view of the tractor feed assembly in FIG. 1 looking in the direction of arrows 3,3 of FIG. 1.

With reference to FIG. 3, the latch mechanism 60 with relation to the notched rail member 30 is shown in solid line in the latched position and in phantom line in the unlatched position. Tractor tongue 80 is so shaped to be a sliding fit in notch 32. Notch 32 is of adequate width and depth to allow smooth sliding action between notch 32 and tractor tongue 80 and to maintain alignment of the tractor with cooperation from the guiding function of splined shaft 26. Latch mechanism 60 includes a two-position, over-center clamp 62, which, when engaged, latches over lip 82 of the notched rail member 30 and clamps the tractor mechanism 34 in position. To move tractor mechanism 34, the operator moves lever 66 together with clamp 62 to the position shown in phantom line, which then allows the operator to move the tractor mechanism 34 along the notched rail member 30 to the desired location. The operator then closes the latch mechanism 60 to the latched position thereby clamping the tractor mechanism 34 in position.

Figure 4:
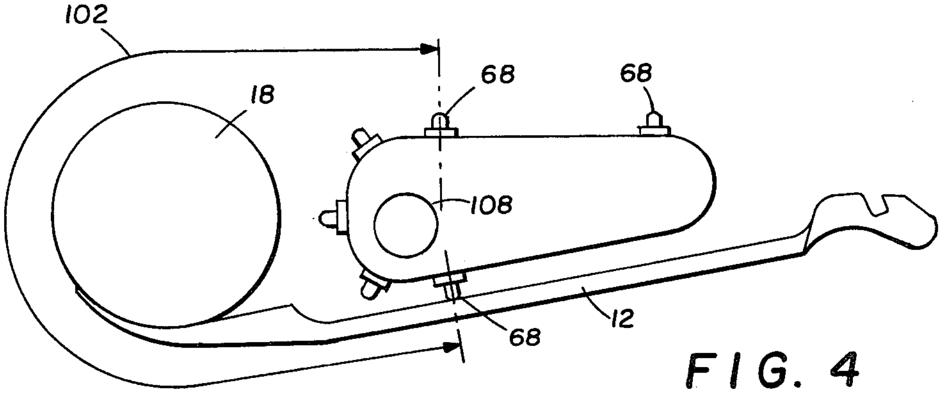
FIG. 4 is a simplified side elevational view showing the relationship between the tractor mechanism and the platen.
Figure 5:
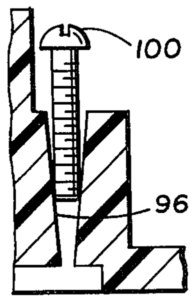
FIG. 5 is a simplified cross-sectional view taken along line 5—5 of FIG. 3 illustrating the adjustment mechanism employed to adjust the dimensional relationship between the platen and the tractor mechanism.

With further reference to FIG. 3, bearing journal 84 for shaft 20 of platen 18 is shown in relation to bearing journal 86 for splined shaft 26 positioned in side plate 14. Bearing journal 86 is suspended from side plate 14 by posts 88, 90 and 92 together with spring 94, which are all formed in a mold using a polycarbonate plastic material. The shaft 20 of platen 18 is considered the reference from which the correct dimensional relationship of the splined shaft 26, which drives tractor mechanisms 34 and 36 to the platen shaft 20, is derived. Between bearing journals 84 and 86 is located a tapered aperture 96 (see FIG. 5), which is slotted through its centerline by slot 98. Drive screw 100 is installed in the tapered aperture 96 and positioned within aperture 96 until a specified dimension 102 is achieved between the centerline of the first offset pin 68 of the inlet side of the tractor mechanism 34, around the platen paper path, to the centerline of the first offset pin 68 of the outlet side of the tractor mechanism 34 (see FIG. 4). The force from drive screw 100 is in opposition to the force from spring 94 with the results being that the splined shaft 26 is maintained in this factory preset position during its normal operation. This adjustment allows the proper tension to always be placed in the record material 54 during operation of the tractor feed assembly 10. This same adjustment feature exists in side plate 16, which is essentially a mirror image of side plate 14.

Figure 6:
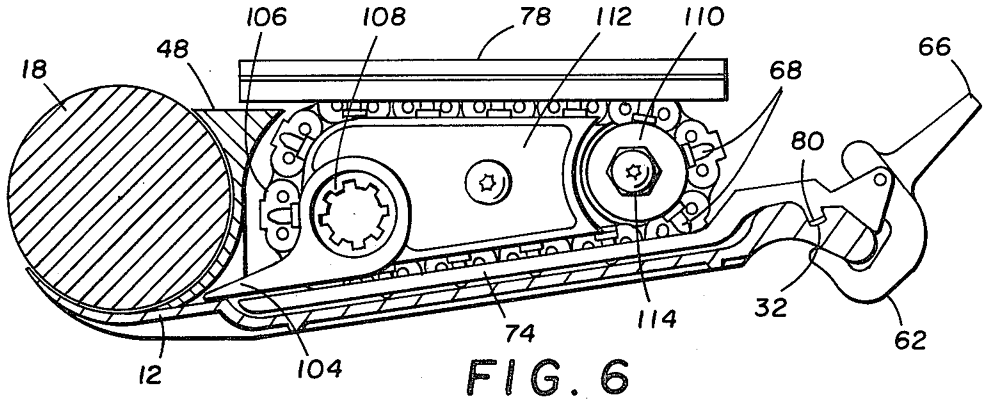
FIG. 6 is a simplified side elevational view showing the tractor mechanism.

With reference to FIG. 6, shoe 104 is shown in relation to the platen 18, paper pan 12, chain 106 and offset pins 68. As the record material (not shown) is being driven toward the platen 18 during loading by the lower section of the loop of chain 106 and offset pins 68, on occasions the record material will not release from the offset pins 68, and a jam will occur in the area between the platen 18 and the chain 106. To prevent this from occurring, shoe 104 is provided at the area between the platen 18 and the chain 106. The flat etended portion of shoe 104 forces any record material from the offset pins 68 and guides the record material (not shown) toward the platen. Drive sprocket 108 operatively surrounds splined shaft 26 and, upon rotation of splined shaft 26, drives chain 106 in the loop configuration as shown in FIG. 6. Stationary support 110 works in conjunction with block 112 and drive sprocket 108 to guide the chain 106 during its travel around the loop configuration. Support 110 is mounted off center so that the eccentric movement of support 110 around mounting means 114 allows adjustment of the slack and tension of chain 106. This adjustment is done at the factory during manufacture.

Figure 7A:
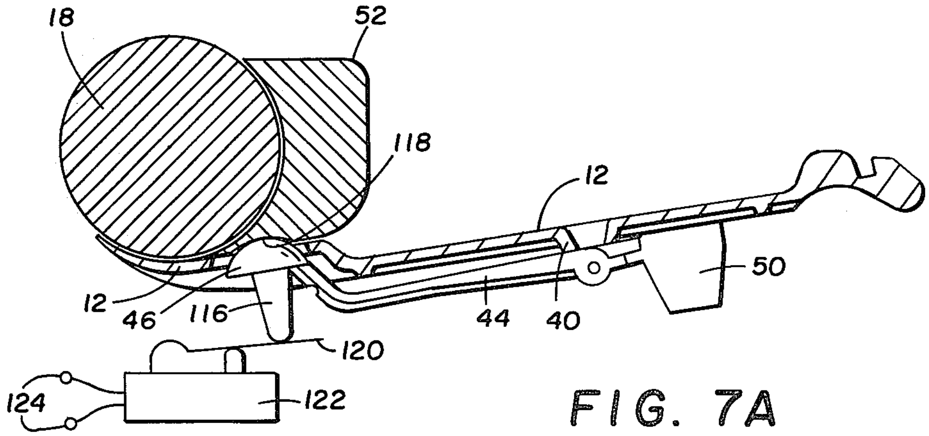
FIG. 7A is a simplified side elevational view showing the paper-out sensing means in the inactivated state.
Figure 7B:
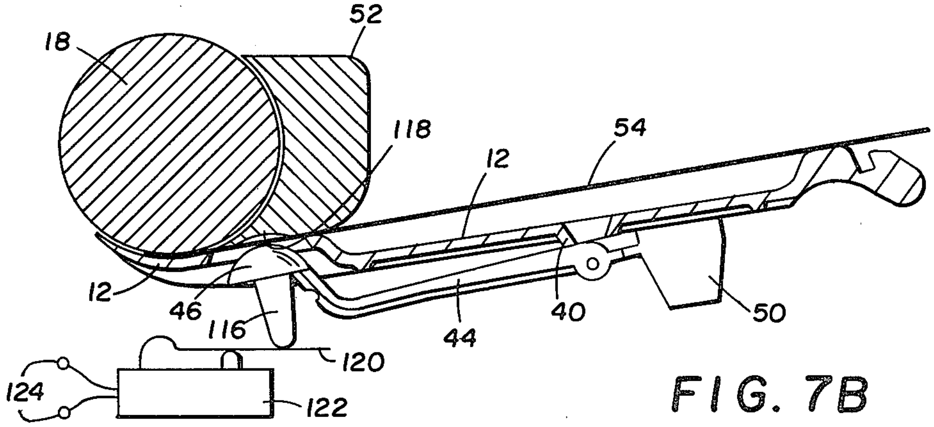
FIG. 7B is a simplified side elevational view showing the paper-out sensing means in the activated state.

With reference to FIG. 7A, the paper-out sensing means is shown comprising rocker arm 44 pivotally mounted to paper pan 12 by post 40 and pin 42. Hemispherical button 46 and counterweight 50 are located at opposite ends of rocker arm 44. Counterweight 50 maintains the button 46 in contact with cup 118 formed in the underneath portion of extension 52. Projection 116 protrudes from button 46 in a direction away from extension 52 and contacts lever 120 of switch 122. Switch 122 is mounted on the printer unit. With an absence of record material between cup 118 and button 46, the effects of the counterweight 50 and the spring force of lever 120 maintain the switch 122 in an "off" condition. When record material is fed between cup 118 and button 46 (see FIG. 7B), rocker arm 44 is pivoted counterclockwise, and switch 122 is actuated to the "on" condition. This condition is then transmitted via terminals 124 to the printer electronics (not shown) so printing may be initiated. When the switch 122 is in the "off" condition, printing is terminated by the printer electronics.

In operation of the specific embodiment employing the present invention and with the modular bidirectional tractor feed assembly 10 installed on a suitable printer, the operator will adjust the positions of tractor mechanisms 34 and 36 to the width position to accommodate the particular width of record material 54 to be used for the printing operation. Graduated scale 56 provides guide lines, which the operator may use to determine the positions desired to place the tractor mechanisms 34 and 36. In order to relocate the tractor mechanisms 34 and 36, the operator will release the tractor mechanisms 34 and 36 from notched rail member 30 by operation of lever 66 and the corresponding lever on tractor mechanism 36, move them to the new location and lock them in place on notched rail member 30 by operation of the same levers. With the assistance of paper edge guide 72 on tractor mechanism 34 and the corresponding paper edge guide on tractor mechanism 36, the operator will insert the leading edge of the record material 54 onto the notched rail member 30, the platform 74 of tractor mechanism 34 and the corresponding platform of tractor mechanism 36. The operator will then initiate paper feed to the printer, which will apply a rotational force to gears 24 and 28 through the connection to the printer. Splined shaft 26 and shaft 20 will rotate resulting in the rotation of platen 18 and chain 106 in tractor mechanism 34 together with the corresponding chain in tractor mechanism 36. As the operator further inserts the record material 54, filling slots 76 and **76*a* and the corresponding filling slots of tractor mechanism 36 provide assist in positioning the perforations 70 over the offset pins 68 for positive and accurate feeding through tractor mechanisms 34 and 36, between the paper pan 12 and bar 48 together with platen 18. After a sufficient portion of record material 54 has been fed, the operation will stop the paper feed and lift guide plate 78 and the corresponding guide plate of tractor mechanism 36 and place the record material 54 around platen 18 and onto the offset pins 68. The perforations 70 of the record material 54 will align because of the factory adjustment of the position of splined shaft 26 relative to shaft 20 of platen 18. The record material will also be properly tensioned. The operator will then lower guide plate 78 and the corresponding guide plate of tractor mechanism 36, and the system will be ready for a printing operation. The presence of record material 54 will be sensed by the paper-out sensing means, and an indication will be sent to the printer that printing may be initiated. As printing continues, gearing (not shown) in the host printer (not shown) will rotate gears 24 and 28, which will result in rotation of platen 18 and tractor mechanisms 34 and 36 and the feeding of the record material 54. The tractor feed assembly 10 will feed the record material 54 in either direction as dictated by the direction of rotation of gears 24 and 28**.

Figure 8A:
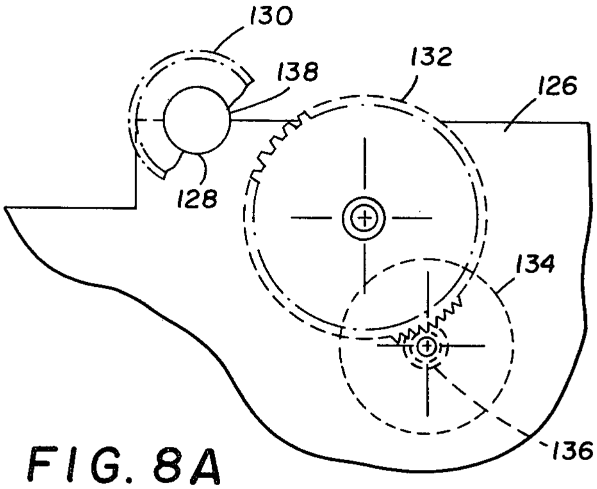
FIG. 8A is a simplified side sectional view showing the platen mounting support and platen drive of a printer capable of employing the present invention.

With reference to FIG. 8A, there is shown a printer frame 126 and support means in the printer frame 126 to accept a platen shaft 138 together with gearing means to rotate the platen (not shown). Mounting support or cutout 128 receives and supports platen shaft 138. Platen motor 134 rotates platen shaft 138 and the platen (not shown) through platen motor gear 136 intermediate gear 132 and platen gear 130. Another mounting support (not shown) is found in printer frame 126 at the opposite end of platen shaft 138 and is essentially of the same configuration as mounting support 128. Further details of the overall printer are disclosed in U.S. Pat. No. 3,902,584, which issued Sept. 2, 1975, and is entitled "Paper Feed System for High-Speed Printer".

Figure 8B:
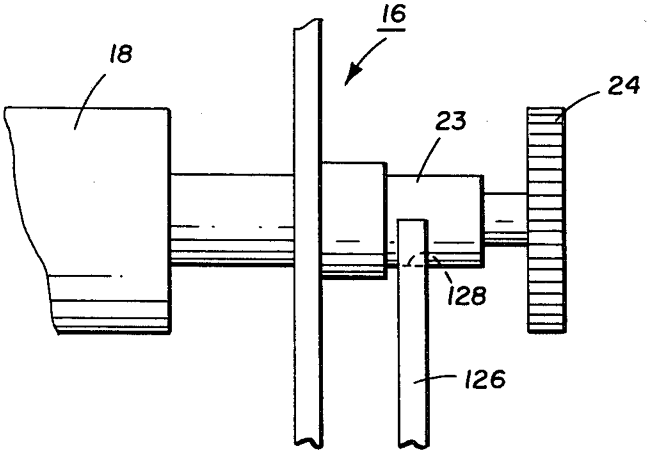
FIG. 8B is a simplified side sectional view showing the mounting support of the present invention employed on a printer.

With reference to FIG. 8B, there is shown the platen 18 and mounting support 23 of tractor feed assembly 10 as they appear mounted in printer frame 126 in lieu of the regular platen of the printer. Mounting support or cutout 128 located in printer frame 126 receives support 23 of tractor feed assembly 10. The other mounting support for support 21 of tractor feed assembly 10 is not shown but is known to be similar to mounting support 128. Gears 24 and 28 are operatively engaged by intermediate gear 132 (shown in FIG. 8A).

Although the present invention has been described with reference to a presently preferred embodiment, it will be appreciated by those skilled in the art that various modifications, alternatives, variations, etc., may be made without departing from the spirit and scope of the invention as defined in the appended claims.

What is claimed is:

1. A modular feed assembly for feeding record material therealong, said mechanism comprising:
- a base member,
- a first and second support member attached to opposite edges of said base member, said first and second support members being substantially parallel to each other,
- a platen rotatably supported about an axis by said first and second support members,
- a drive shaft rotatably supported about an axis by said first and second support members and positioned substantially parallel to said platen,
- feed means operatively engaging said drive shaft to be driven thereby, and
- means interconnecting said platen and said drive shaft for simultaneously rotating the same.

2. Apparatus as recited in claim 1 wherein said first and second support members are one-piece units so constructed and arranged to allow for relative movement between said platen axis and said drive shaft axis and means for causing said movement to adjust the distance between said axes.

3. Apparatus as recited in claim 1 wherein said feed means is a tractor feed means.

4. Apparatus as recited in claim 2 wherein said adjusting means includes juxtaposed members positioned between and in contact with said platen axis and said drive shaft, said juxtaposed members formed to provide a tapered aperture therebetween, spreading means adjustably positionable into said tapered aperture to vary the distance between said juxtaposed members.

5. Apparatus as recited in claim 1 wherein said first and second support members include projections extending outwardly therefrom and aligned with the axis of the platen for operatively supporting the feed assembly on a printer.

6. Apparatus as recited in claim 1 wherein said base member includes a groove formed therein substantially parallel to said platen, and said feed means includes a tongue portion operatively positioned in said groove and cooperating therewith in a guiding function during positioning of said feed means along said base member in a direction parallel to said platen.

7. Apparatus as recited in claim 6 wherein said feed means includes locking means operatively positioned with respect to said second edge portion to prevent movement of said feed means along said second edge portion upon activation of said locking means.

8. Apparatus as recited in claim 7 wherein said locking means comprises an over-center C-shaped clamp.

9. A tractor mechanism, including a pair of drive tractors, for feeding record material having spaced apertures therealong, each drive tractor comprising:
- a chain support member,
- a chain drive sprocket rotatably supported in a first end portion of said chain support member,
- a non-rotating chain adjusting member operatively supported on a second end portion of said chain support member,
- a chain operatively positioned to be driven by said chain drive sprocket for movement in a loop configuration around said chain support member, said chain drive sprocket and said chain adjusting member, said chain including pin members operatively positioned to cooperate with said apertures in said record material for feeding same along a feed path,
- drive means operatively positioned to rotate said chain drive sprocket for movement of said chain in said loop configuration, and
- said chain adjusting member includes adjustable mounting means operatively constructed to allow said chain adjusting member to be moved in an eccentric path, in a plane formed by said loop configuration of said chain, to vary tension in said chain.

10. Apparatus as recited in claim 9 further including means for assisting removal of said record material from said pins as the record material exits said drive tractors, said removal assist means including a platform member extending forwardly in the direction of paper feed from said chain support member and positioned to contact a surface of the record material, which faces said drive tractors while being fed therethrough, as the record material exits said drive tractors.

* * * * *

Disclaimer 4,304,345.—*E. Michael Carlin,* Milpitas, Calif. MODULAR BIDIRECTIONAL TRACTOR FEED ASSEMBLY. Patent dated Dec. 8, 1981. Disclaimer filed Oct. 20, 1983, by the assignee, *Xerox Corp.*

Hereby enters this disclaimer to claims 1-10 of said patent.

[*Official Gazette December 13, 1983.*]